(12) United States Patent
Hara (10) Patent No.: US 10,135,184 B2
(45) Date of Patent: Nov. 20, 2018

(54) LEVER-TYPE CONNECTOR

(71) Applicant: Sumitomo Wiring Systems, Ltd., Yokkaichi, Mie (JP)

(72) Inventor: Teruo Hara, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/860,749

(22) Filed: Jan. 3, 2018

(65) Prior Publication Data

US 2018/0198233 A1 Jul. 12, 2018

(30) Foreign Application Priority Data

Jan. 12, 2017 (JP) .................. 2017-003106

(51) Int. Cl.
| | |
|---|---|
| *H01R 13/62* | (2006.01) |
| *H01R 13/629* | (2006.01) |
| *H01R 24/66* | (2011.01) |
| *B60R 16/02* | (2006.01) |

(52) U.S. Cl.
CPC ....... *H01R 13/62938* (2013.01); *H01R 24/66* (2013.01); *B60R 16/0207* (2013.01)

(58) Field of Classification Search
CPC .............. H01R 13/62938; H01R 24/66; B60R 16/0207

USPC .................................................. 439/157, 372
See application file for complete search history.

(56) References Cited

U.S. PATENT DOCUMENTS

| | | | |
|---|---|---|---|
| 2008/0233778 A1* | 9/2008 | Moll .................. | H01R 13/7032 439/188 |
| 2008/0233784 A1* | 9/2008 | Patterson ........... | H01R 13/5205 439/278 |
| 2015/0140847 A1* | 5/2015 | Kanemura ......... | H01R 13/4368 439/259 |

FOREIGN PATENT DOCUMENTS

JP          2016-6756        1/2016

* cited by examiner

*Primary Examiner* — Khiem Nguyen
(74) *Attorney, Agent, or Firm* — Gerald E. Hespos; Michael J. Porco; Matthew T. Hespos (57) ABSTRACT

A lever-type connector (10) includes a lever (40) provided with a cam groove (41), a first housing (30) having the lever (40) movably mounted thereon, and a second housing (60) provided to be connectable to the first housing (30). The second housing (60) includes a lever shaft (64) movable along the cam groove (41) according to a movement of the lever (40), a lever fitting portion (72) to which a peripheral edge part of the lever (40) is fit, and a bracket mounting portion (66) disposed behind an entrance space (71) for the lever (40) and provided with a locking claw (67). The locking claw (67) is disposed between the lever shaft (64) and the lever fitting portion (72) when the second housing (60) is viewed from a connecting direction.

3 Claims, 8 Drawing Sheets

LEVER-TYPE CONNECTOR

BACKGROUND

Field of the Invention

This specification relates to a lever-type connector.

Description of the Related Art

Japanese Unexamined Patent Publication No. 2016-6756 discloses a connector with a first holding member for holding a first terminal, a second holding member for holding a second terminal and a lever to be assembled with the first and second holding members. A fitting guide is provided on the lever and is provided with a fitting guide, and a fitting projection is provided on the second holding member. The first and second holding members can be fit and separated by guiding the fitting projection along the fitting guide.

A bracket made of metal generally is used for mounting a connector on a body of a vehicle. The bracket has a long narrow metal plate with a locking hole. On the other hand, the second holding member has a bracket mounting portion with a locking piece. The second holding member is mounted on the bracket by fitting the locking piece into the locking hole. The bracket mounting portion often is formed by being demolded in a connector connecting direction together with the fitting projection, and the fitting projection and the bracket mounting portion need to be arranged not to overlap in the connecting direction for the convenience of demolding. The fitting projection and the bracket mounting portion may be shifted in a width direction of the connector. However, this shifting will enlarge the connector in the width direction.

SUMMARY

A lever-type connector disclosed by this specification includes first and second housings that are connectable to one another. A lever is mounted on the first housing and is formed with a cam groove. The second housing includes a lever shaft, a lever fitting portion and a bracket mounting portion. The lever shaft moves along the cam groove as the lever moves. The lever fitting portion is fit to a peripheral edge part of the lever is fit. The bracket mounting portion is disposed behind an entrance space for the lever and is provided with a locking claw that is disposed between the lever shaft and the lever fitting portion when the second housing is viewed from a connecting direction.

According to this configuration, a space between a space for molding the lever shaft and a space for molding the lever fitting portion can be used as a molding space for molding the locking claw. Thus, the second housing can be molded even if the bracket mounting portion is disposed behind the entrance space for the lever. As a result, the second housing is not enlarged in a width direction perpendicular to the connecting direction and an enlargement of the lever-type connector in the width direction can be avoided.

The lever fitting portion may include a restricting portion for restricting a movement of the cam groove of the lever in a separating direction from the lever shaft and a coupling that couples the restricting portion and an outer surface of the second housing. The locking claw may be disposed between the lever shaft and the coupling when the second housing is viewed from the connecting direction. According to this configuration, the locking claw can be molded using a mold for molding the lever shaft or the coupling.

The lever may be mounted rotatably on the first housing and the coupling may extend in an arcuate manner. Thus, the lever fitting portion can be miniaturized without having a peripheral edge of the lever interfere with the coupling when the lever is rotated.

The lever entrance space and the bracket mounting portion may be arranged in the connecting direction and miniaturize the lever-type connector in the width direction.

DETAILED DESCRIPTION

Figure 1:
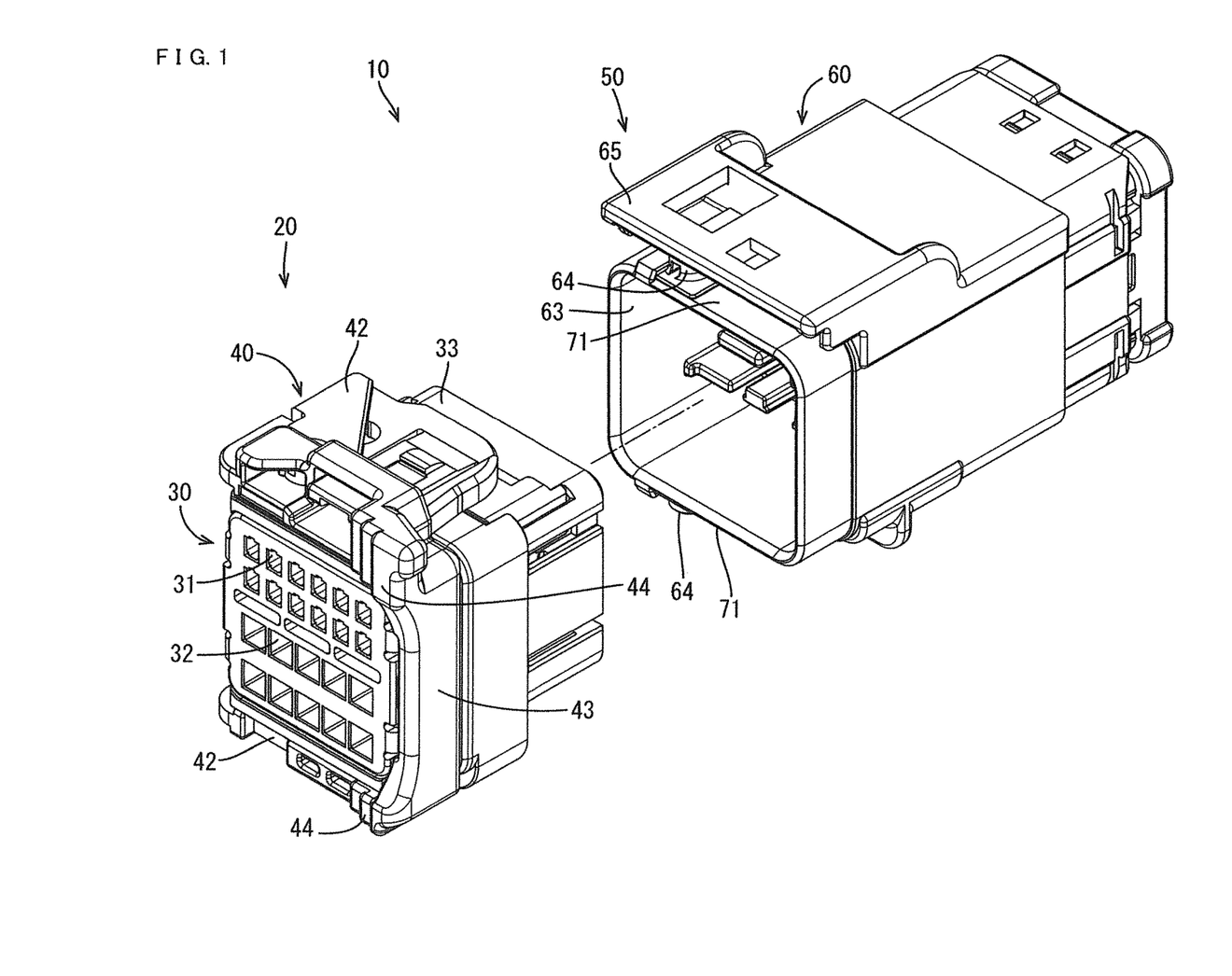
FIG. 1 is a perspective view of a lever-type connector before connection.

As shown in FIG. 1, a lever-type connector 10 in this embodiment is composed of a first connector 20 and a second connector 50 connectable to each other. The first connector 20 includes a first housing 30 and a lever 40.

The first housing 30 is made of synthetic resin and is in the form of a substantially rectangular block. Large and small cavities 31, 32 penetrate through the first housing 30 in a front-rear direction. The small cavities 31 are disposed in an upper half of the first housing 30 and the large cavities 32 are disposed in a lower half of the first housing 30.

Figure 6:
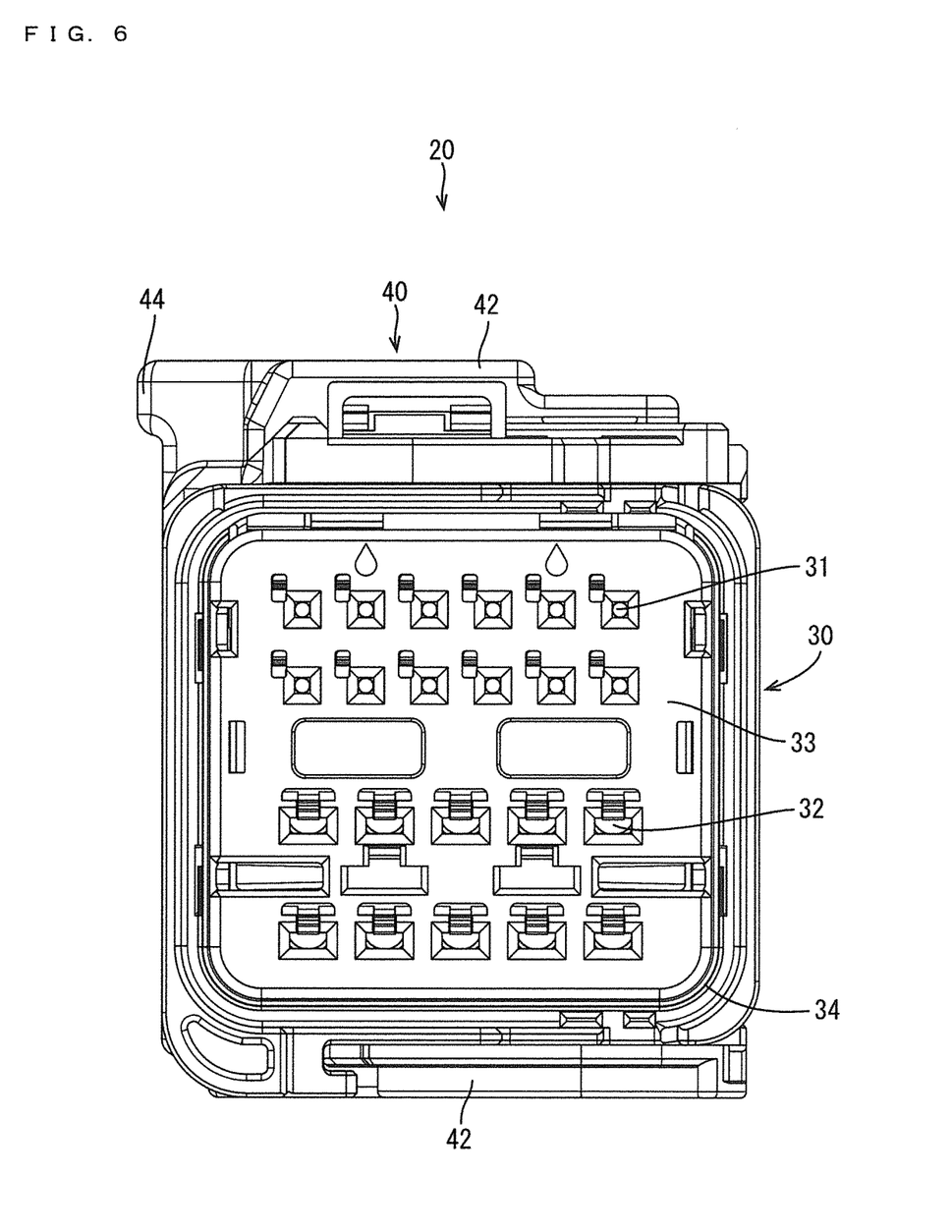
FIG. 6 is a front view of a first connector.

As shown in FIG. 6, a front cap 33 is mounted on a connection surface of the first housing 30. Further, a rubber ring 34 is fit on the outer peripheral surface of the first housing 30 and forward detachment of this rubber ring 34 is suppressed by the front cap 33.

The lever 40 is made of synthetic resin and has two cam plates 42 connected by a coupling arm 43 to define a U-shape. Each cam plate 42 has a cam groove 41. Operating portions 44 are provided on upper and lower parts of the coupling arm 43. As shown in FIG. 1, the upper cam plate 42 is disposed along the upper surface of the first housing 30, and the lower cam plate 42 is disposed along the lower surface of the first housing 30. Further, each coupling arm 43 is disposed along a side surface of the first housing 30.

Figure 7:
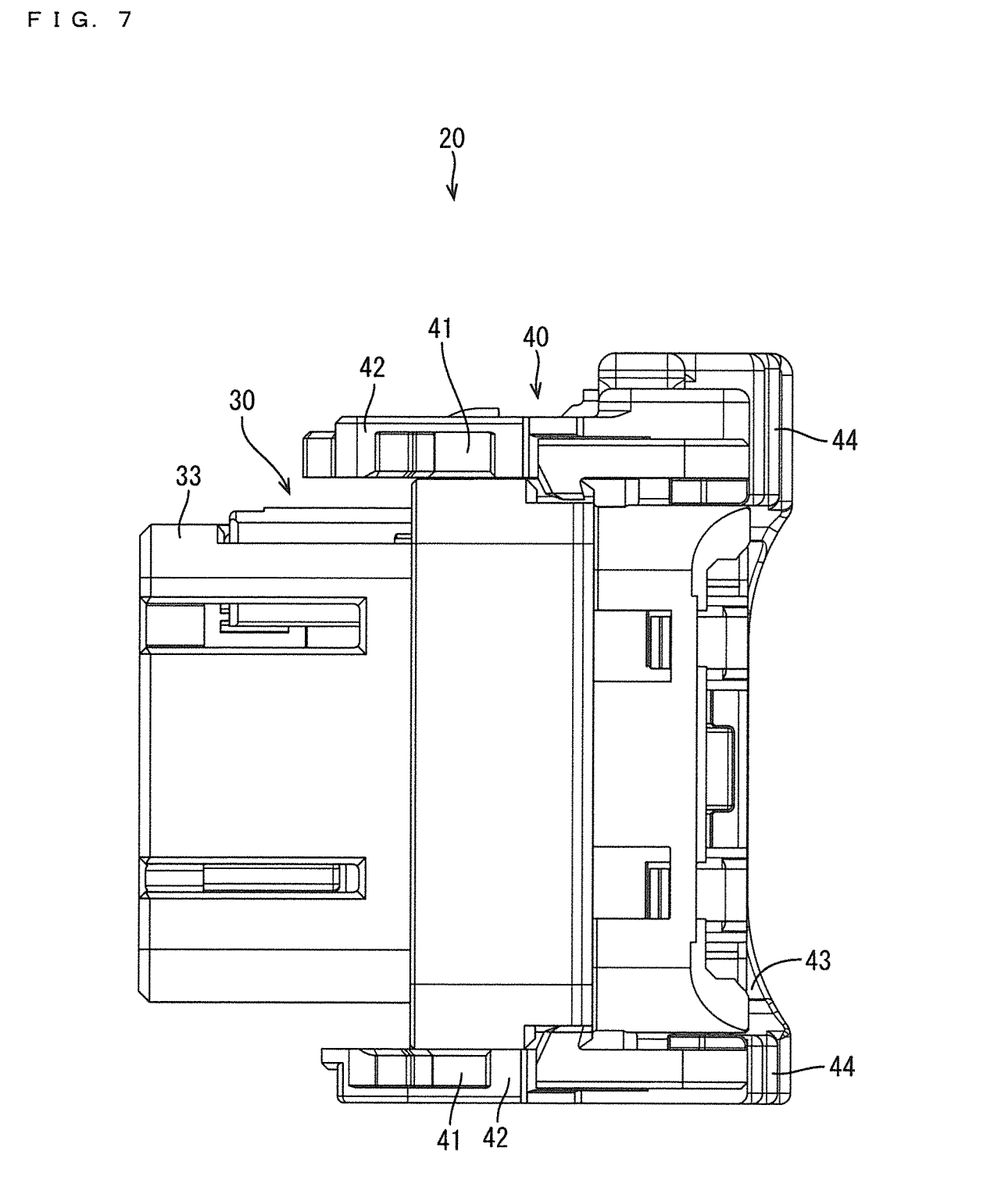
FIG. 7 is a side view of the first connector.
Figure 8:
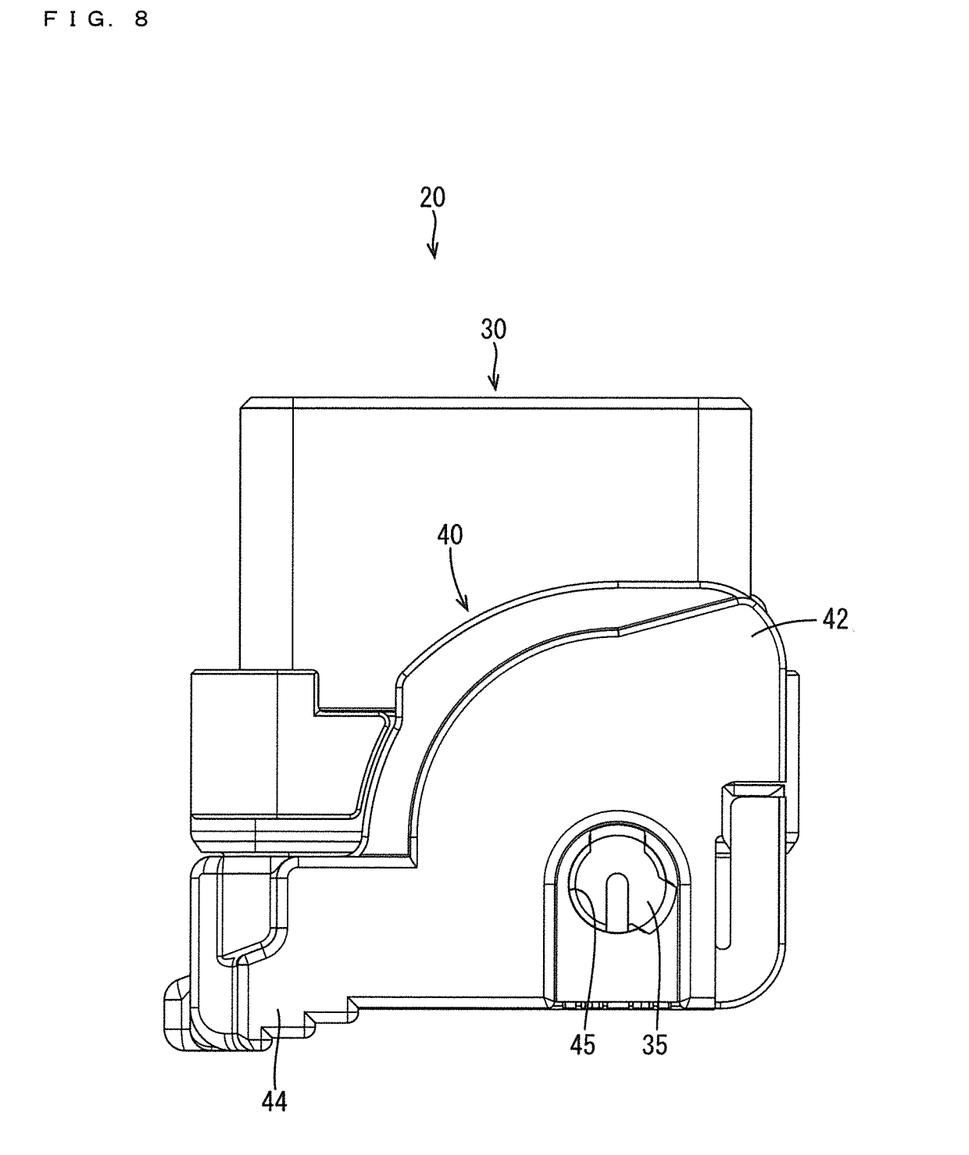
FIG. 8 is a bottom view of the first connector.

The lever 40 is mounted on the first housing 30. Specifically, as shown in FIG. 8, a supporting shaft 35 is provided on the lower surface of the first housing 30 and the cam plate 42 is provided with a supporting hole 45 into which the supporting shaft 35 is fit for rotatably supporting the cam plate 42. This causes the lever 40 to be mounted rotatably between a connection position shown in FIG. 1 and an unillustrated initial position with respect to the first housing 30. The cam grooves 41 of the lever 40 face forward at the initial position, and face laterally at the connection position as shown in FIG. 7.

Figure 2:
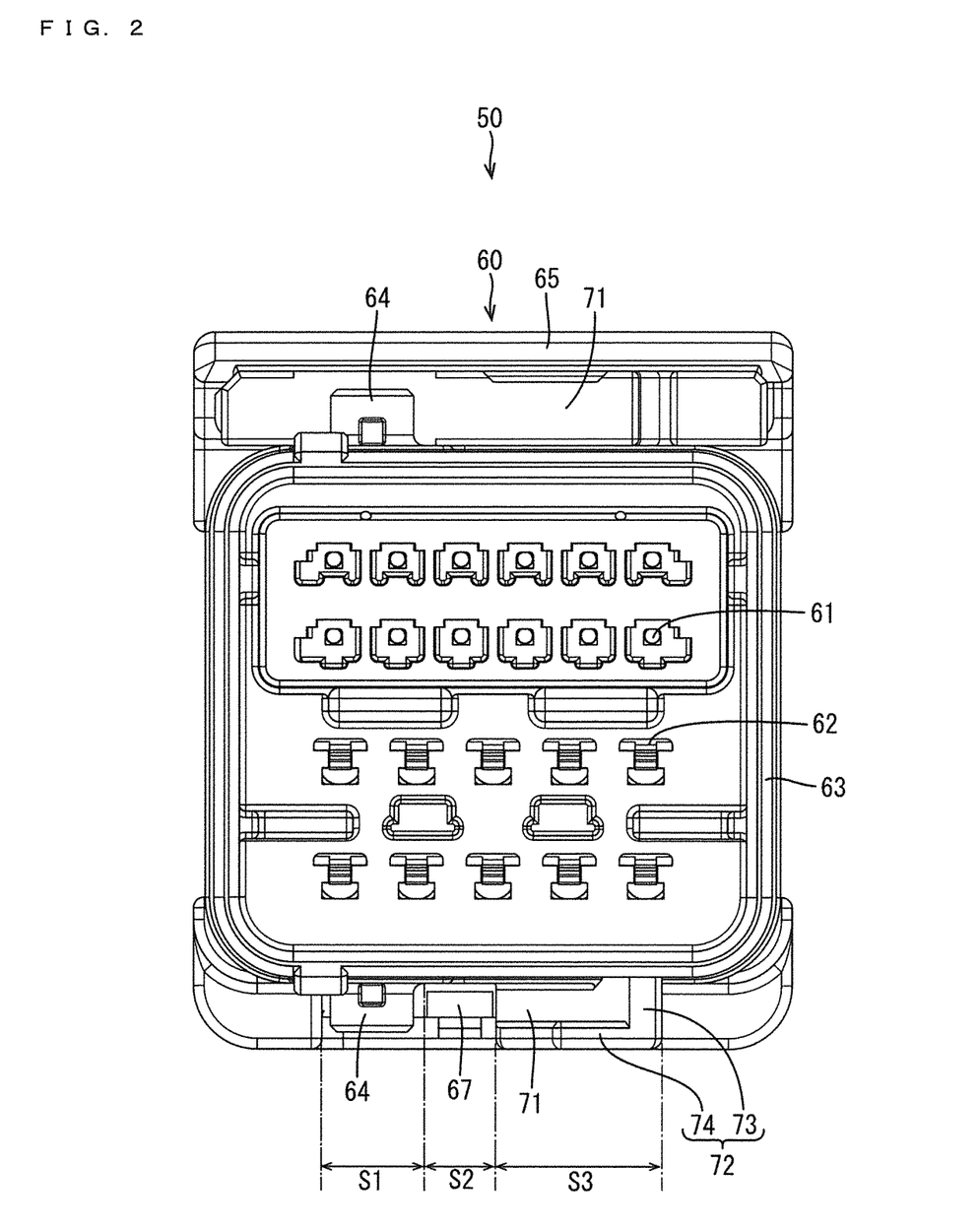
FIG. 2 is a front view of a second connector.

The second connector 50 includes a second housing 60 made of synthetic resin. As shown in FIG. 2, large and small cavities 61, 62 are provided inside the second housing 60 at positions corresponding to the respective cavities 31, 32 of the first housing 30. Further, the second housing 60 includes a receptacle 63 surrounding the cavities 61, 62. The first housing 30 is fit into the receptacle 63 and the rubber ring 34 is sandwiched between the outer peripheral surface of the first housing 30 and the inner peripheral surface of the receptacle 63 of the second housing 60, when the first and second housings 30, 60 are connected thereby sealing the inside of the receptacle 63 against water.

Figure 3:
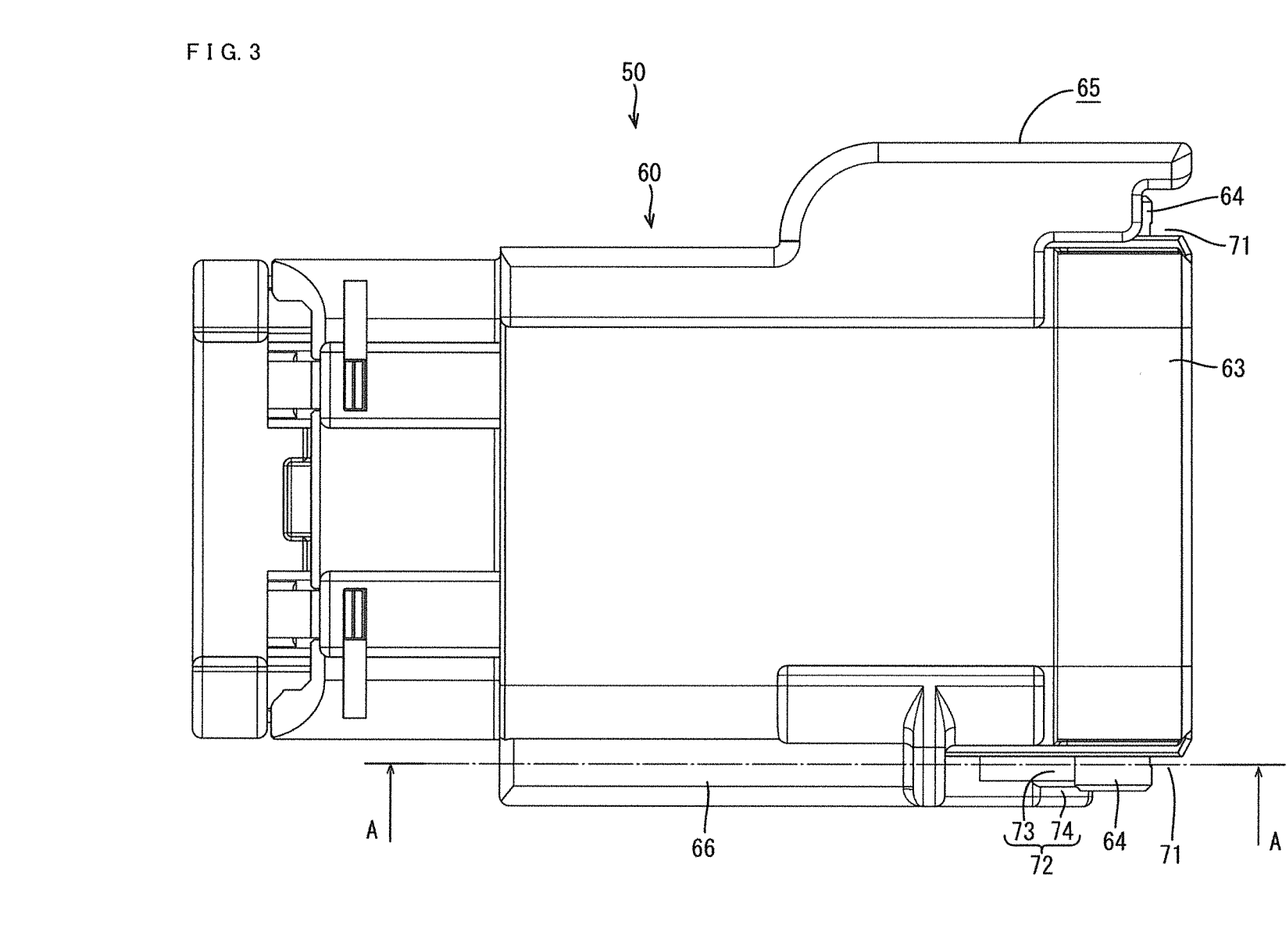
FIG. 3 is a side view of the second connector.

Lever shafts 64 are provided on the upper and lower surfaces of the second housing 60. The lever shafts 64 enter the cam grooves 41 and then move along the cam grooves 41 of the lever 40 as the lever 40 is rotated. At this time, the lever shafts 64 engage inner walls of the cam grooves 41 to exhibit a cam action so that the first and second housings 30, 60 are connected and separated. As shown in FIG. 3, a protection wall 65 is provided on the upper surface of the first housing 30 for covering and protecting the lever shaft 64. As shown in FIG. 2, the protection wall 65 is hollow in the front-rear direction.

On the other hand, a bracket mounting portion 66 is provided on the lower surface of the second housing 60. The second connector 50 is fixed to a body of a vehicle via an unillustrated bracket, one end of the bracket is fixed to the body and the other end of the bracket is inserted into the bracket mounting portion 66 to be fixed. Normally, the bracket is formed of a flat plate made of metal and includes a locking hole (not shown) for fixing. Thus, the bracket mounting portion 66 has a locking claw 67 to be fit into the locking hole of the bracket for locking.

Figure 4:
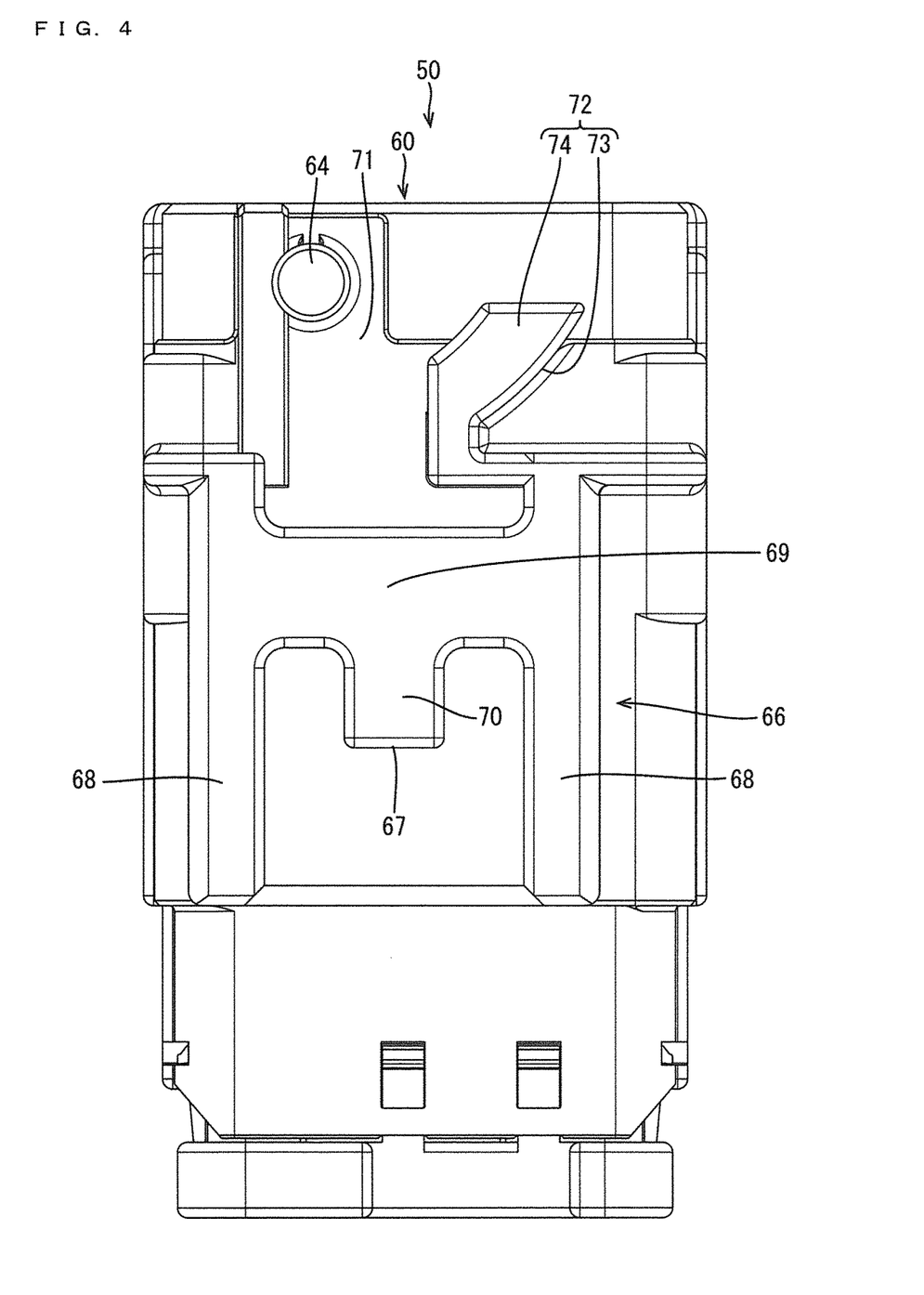
FIG. 4 is a bottom view of the second connector.

The bracket mounting portion 66 is composed of left and right bracket supports 68 into which side edge parts of the bracket are inserted and a lock 69 extending between these bracket supports 68 as shown in FIG. 4. A locking piece 70 is cantilevered rearward in a central part of the lock 69, and the locking claw 67 is provided on an inner side of the rear end of the locking piece 70. As shown in FIG. 2, the locking claw 67 projects up from the upper surface of the locking piece 70 so that a projecting direction of the locking claw 67 is opposite to that of the lever shaft 64.

As shown in FIG. 4, spaces around the lever shafts 64 serve as lever entrance spaces 71 in which the lever 40 moves rearward while being rotated. In this embodiment, the bracket mounting portion 66 is disposed behind the lever entrance spaces 71. That is, the lever entrance spaces 71 and the bracket mounting portion 66 are arranged in the front-rear direction, and the second housing 60 can be miniaturized in a width direction (direction perpendicular to the front-rear direction) as compared to the case where the lever entrance spaces and the bracket mounting portion are arranged in the width direction.

Figure 5:
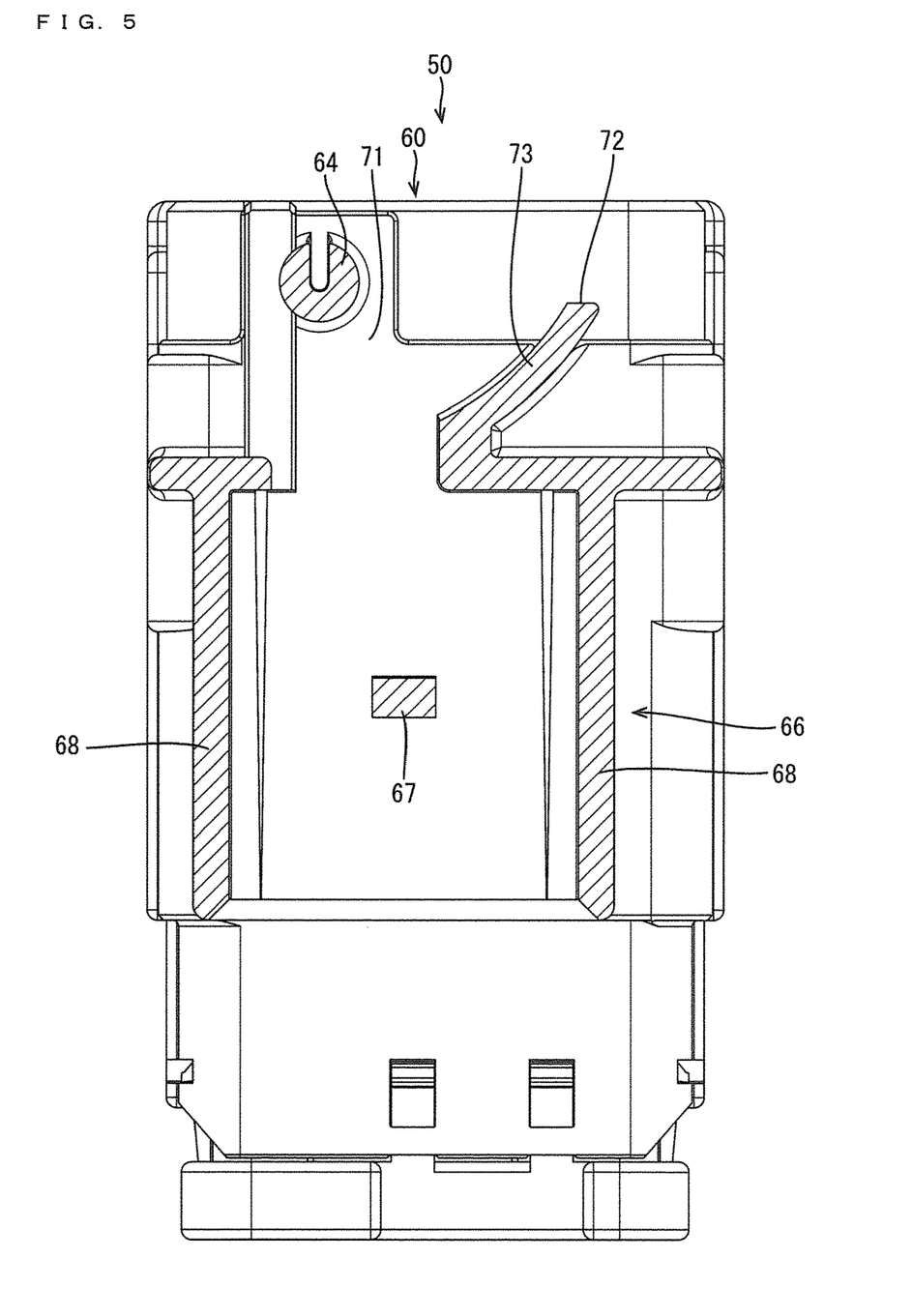
FIG. 5 is a section along A-A in FIG. 3.

The lever entrance space 71 has a lever fitting portion 72 to which a peripheral edge of the cam plate 42 of the lever 40 is fit. As shown in FIG. 2, the lever fitting portion 72 includes a coupling 73 projecting down from the lower surface of the second housing 60 and a restricting portion 74 protruding toward the lever shaft 64 from a lower end part of the coupling 73. Specifically, the lever fitting portion 72 has an L-shaped cross-section, and the restricting portion 74 is coupled to the lower surface of the second housing 60 by the coupling 73. As shown in FIG. 5, the coupling 73 extends in an arcuate manner and the peripheral edge of the cam plate 42 does not interfere with the coupling 73 when a connecting operation is performed while the lever 40 is rotated, thereby contributing to miniaturization of the lever fitting portion 72.

As the first and second housings 30, 60 are connected, the lever 40 of the first housing 30 approaches the lever fitting portions 72 and the peripheral edge parts of the cam plates 42 are fit to the lever fitting portions 72 while rotating. In a connected state, the restricting portion 74 restricts a downward movement of the cam plate 42 from the lower surface of the second housing 60 so that the lever shaft 64 cannot separate from the cam groove 41.

In the lever-type connector 10 of this embodiment, the second housing 60 is miniaturized in the width direction by disposing the bracket mounting portion 66 behind the lever entrance spaces 71. Thus, a mold for molding the lever shaft 64 and the lever fitting portion 72 disposed in the lever entrance space 71 and a mold for molding the locking claw 67 of the bracket mounting portion 66 are shifted so as not to interfere with each other. In other words, as shown in FIG. 2, a lever shaft molding space 51 for molding the lever shaft 64, a locking claw molding space S2 for molding the locking claw 67 and a lever fitting portion molding space S3 for molding the lever fitting portion 72 are arranged not to overlap each other.

Specifically, the locking claw 67 is between the lever shaft 64 and the coupling 73 of the lever fitting portion 72 when the second housing 60 is viewed from the front in the connecting direction. As a result, the lever shaft molding space 51, the locking claw molding space S2 and the lever fitting portion molding space S3 are arranged tightly in this order. Note that a width of the lever entrance space 71 substantially matches that of a molding space as the sum of the lever shaft molding space S1, the locking claw molding space S2 and the lever fitting portion molding space S3.

As described above, in this embodiment, a space between the molding space for molding the lever shaft 64 (lever shaft molding space S1) and the molding space for molding the lever fitting portion 72 (lever fitting portion molding space S3) can be used as the molding space for molding the locking claw 67 (locking claw molding space S2). Thus, the second housing 60 can be molded even if the bracket mounting portion 66 is disposed behind the entrance spaces 71 for the lever 40. As a result, an enlargement of the second housing 60 in the width direction perpendicular to the connecting direction can be avoided and an enlargement of the lever-type connector 10 in the width direction can be avoided.

The lever fitting portion 72 may include the restricting portion 74 for restricting movement of the cam groove 41 of the lever 40 in a separating direction from the lever shaft 64 and the coupling 73 for coupling the restricting portion 74 and the outer surface of the second housing 60, and the locking claw 67 may be between the lever shaft 64 and the coupling 73 when the second housing 60 is viewed from the connecting direction. Accordingly, the locking claw 67 can be molded using the mold for molding the lever shaft 64 or the coupling 73.

The lever 40 may be mounted rotatably on the first housing 30 and the coupling 73 may extend in an arcuate manner. Accordingly, the lever fitting portion 72 can be miniaturized without causing the peripheral edge of the lever 40 to interfere with the coupling 73 when the lever 40 is rotated.

The technique disclosed by this specification is not limited to the above described and illustrated embodiment. For example, the following various modes are also included.

Although the locking claw 67 disposed between the lever shaft 64 and the coupling 73 of the lever fitting portion 72 is illustrated in the above embodiment, the locking claw may be disposed between the lever shaft 64 and the restricting portion 74 of the lever fitting portion 72.

Although the rotary lever 40 is illustrated in the above embodiment, a slide lever may be used. In that case, the coupling of the bracket mounting portion may extend straight.

LIST OF REFERENCE SIGNS

10 . . . lever-type connector
30 . . . first housing
40 . . . lever
41 . . . cam groove
60 . . . second housing
64 . . . lever shaft
66 . . . bracket mounting portion
67 . . . locking claw
71 . . . lever entrance space
72 . . . lever fitting portion
73 . . . coupling
74 . . . restricting portion
S1 . . . lever shaft molding space
S2 . . . locking claw molding space
S3 . . . lever fitting portion molding space

What is claimed is:

1. A lever-type connector, comprising:
a lever provided with a cam groove;
a first housing having the lever movably mounted thereon; and
a second housing provided to be connectable to the first housing;
wherein:
the second housing includes a lever shaft movable along the cam groove according to a movement of the lever, a lever fitting portion to which a peripheral edge part of the lever is fit, and a bracket mounting portion disposed behind an entrance space for the lever and provided with a locking claw; and
the locking claw is disposed between the lever shaft and the lever fitting portion when the second housing is viewed from a connecting direction.

2. The lever-type connector of claim 1, wherein the lever fitting portion includes a restricting portion for restricting a movement of the cam groove of the lever in a separating direction from the lever shaft and a coupling for coupling the restricting portion and an outer surface of the second housing, and the locking claw is disposed between the lever shaft and the coupling when the second housing is viewed from the connecting direction.

3. The lever-type connector of claim 2, wherein the lever is rotatably mounted on the first housing and the coupling extends in an arcuate manner.

* * * * *